United States Patent [19]

Guido

[11] 3,759,179
[45] Sept. 18, 1973

[54] CREDIT CARD AND SIGNATURE VERIFICATION SYSTEM

[76] Inventor: Peter Guido, 6386 No. Hiawatha Ave., Chicago, Ill. 60646

[22] Filed: May 5, 1971

[21] Appl. No.: 140,462

[52] U.S. Cl.................... 101/368, 40/2.2, 283/8 R
[51] Int. Cl............................................. B41l 47/04
[58] Field of Search........................ 101/368, 369; 283/8 R; 40/2.2

[56] References Cited
UNITED STATES PATENTS

| 705,831 | 7/1902 | Falardeau | 101/426 X |
| 3,388,661 | 6/1968 | Decof | 101/369 |
| 3,460,476 | 8/1969 | Swigert et al. | 101/450 |
| 3,645,204 | 2/1972 | Gosnell | 101/369 X |
| 3,605,620 | 9/1971 | Mueller | 101/401.1 |
| 3,217,643 | 11/1965 | Crissy et al. | 101/369 X |
| 1,801,593 | 4/1931 | Dugdale | 101/369 |
| 2,953,988 | 9/1960 | Seifried et al. | 101/369 |

Primary Examiner—Clyde I. Coughenour
Attorney—Everett A. Johnson

[57] ABSTRACT

An improved system of signature identification for credit card users includes an embossed reverse image of the true signature of the authorized card holder. The card code or account number may also be embossed in reverse script on the print face of the card.

4 Claims, 6 Drawing Figures

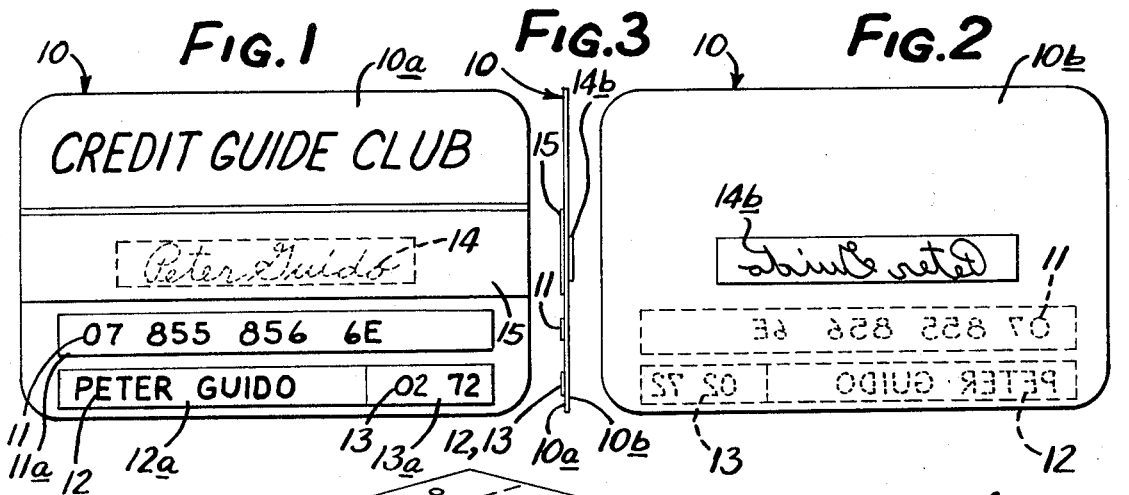
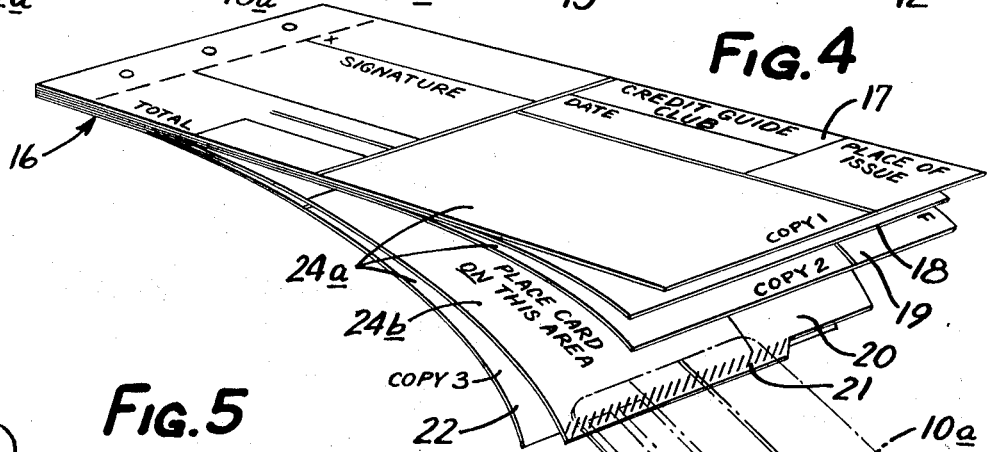
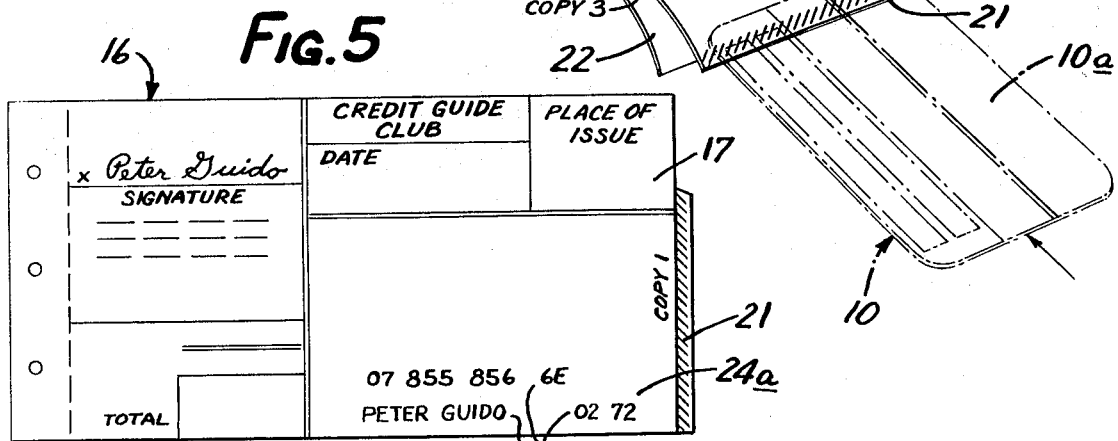
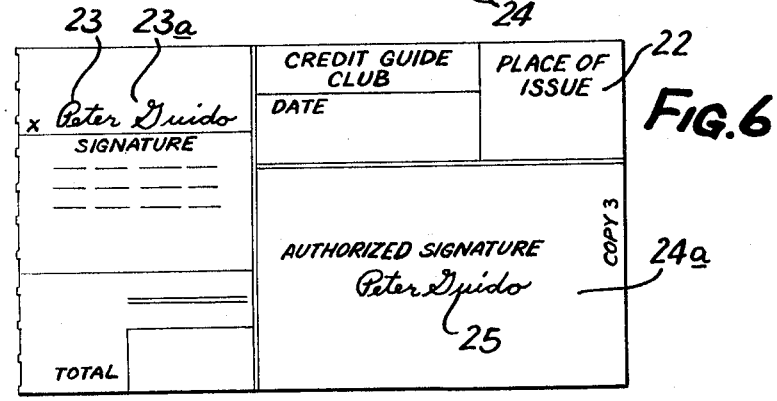

CREDIT CARD AND SIGNATURE VERIFICATION SYSTEM

The present invention relates generally to a credit card identification and protection system and more particularly to an article and method for comparing a written signature of a person actually using the card with the imprint of the true signature of the person who is in fact authorized to present the card.

Various sytems have been proposed heretofore to identify the authorized card holder including photographs, fingerprints, written signatures added to the card by the holder when he receives it, and electronically readable invisible indicia printed on or embedded in the body of the card. All such systems have their drawbacks and shortcomings including the cost of preparing the card, the need for sophisticated equipment in reading the card, the likelihood of alteration, and the inconvenience to the holder.

The present invention overcomes the above-noted shortcomings of the prior art while providing a simple, efficient system for verifying the signature of a person signing a credit charge form while retaining a permanent record of his signature and the authorized imprint signature. Although the invention is herein described as a credit card identification system for which it is particulary devised, it is to be understood that the invention is readily adaptable to the verifying of signatures on other than credit card charge forms.

Accordingly, it is an object of this invention to reduce the possibility of unauthorized use of a lost or stolen credit card. In attaining this object, the card is provided with the reverse script embossing of the card holder's signature for visual comparison with the written signature of the person actually presenting the card in a transaction.

In use, the charge ticket is prepared in multiple copies and after entering the transaction the embossed indicia, including the imprint signature is applied to the ticket by the usual and well-known manner of inserting the card and charge ticket into the card printer and running a pressure roler over the card and charge ticket to transfer the indicia in positive script onto all or selected copies of the charge ticket. In a preferred embodiment of the invention the imprint of the signature does not appear on the original to be signed by the card holder but only on a comparison ticket viewable by the party giving credit and retained by him as permanent verification of the signature. Thus when the imprint is made, the imprint of the authorized signature appears on a copy of the charge ticket together with the written signature of the party presenting the card. The visual comparison is then made by the person giving credit in the transaction.

Additional objects and advantages of the invention will be apparent from the description of the accompanying drawings wherein:

FIG. 1 is a front or obverse view of a typical credit card having the authorized signature in embossed reverse script on the reverse face;

FIG. 2 is a view of the back or reverse imprint face of the card in FIG. 1;

FIG. 3 is an end view of the card in FIGS. 1 and 2 with the embossed indicia on the front face of the card and the embossed reverse script signature on the back face shown schematically;

FIG. 4 is a perspective view of a credit card charge form designed for use with the card of FIGS. 1, 2, and 3;

FIG. 5 is a plan view of the charge form of FIG. 4 showing the written signature and the imprinted indicia; and FIG. 6 is a plan view of the signature comparison copy showing the written signature and the imprinted authorized signature for comparison.

Briefly, the article and system of the invention includes a credit card of generally conventional size modified in accordance with the invention by having the card holder's authorized signature permanently embossed on the card as will be described. The credit charge form it self is modified to provide a facsimile or imprint of the authorized signature on selected copies of the form but not visible to the person signing the ticket at the time of the transaction.

This provides an immediate visual comparison of the written and imprinted signatures at the time of the transaction and a permanent record of the signature verification.

Referring to the drawing, the card 10 has on its front face 10a the name of the card issuer, the card or account number 11 in panel 11a, the holder's name 12 in panel 12a, and the expiration date 13 in panel 13a. All of 11, 12, and 13 are embossed in positive script as is conventional and are visually readable from the front of the card 10.

Also on the front face of the card is the holder's engraved signature 14, appearing in embossed reverse script on the back face 10b of card 10 as shown in FIGS. 2 and 3 at 14b. An opaque strip 15 covers the engraved authorized signature 14 on the front face of the card as shown in FIGS. 1 and 2. If desired, the authorized signature panel 14b and the strip 15 may be an insert into the body of card 10 but when this construction is used its subsequent removal or substitution invalidates the card. Further with respect to FIG. 2, this shows the reverse script signature 14b and a representation of the code 11, the printed name 12 and the expiration date 13 embossed in positive script on the front face as shown in FIGS. 1 and 2.

Referring to FIGS. 4, 5, and 6, the credit charge form 16 is in triplicate including a first copy 17 having card imprint panel 24a, a first transfer sheet or carbon 18, which is double faced, the second copy 19 of the charge form 16 having imprint panel 24a, the second transfer or carbon sheet 20 having indexing tab 21 and imprinting guide panel 24b on which the card 10 is placed face 10a up, and the third or signature comparison copy 22 with panel 24a on which the authorized identification signature 25 is imprinted by the embossed signature 14b.

Each of copies 17, 19, and 22 of form 16 includes the written signature panel 23a where signature 23 is written by the card user at the time of the transaction.

In completing the transaction, the card 10 is placed over panel 24b on transfer sheet 20 and beneath copy 19 (and hence also under copy 17 and transfer sheet 18). The conventional imprinter procedure is then followed to produce the completed ticket 17 as shown in FIG. 5 and concurrently produces copy 3 as shown in FIG. 6. The index tab 21 on transfer sheet 20 guides the person preparing the charge ticket to the panel 24b over which the card 10 is placed with face 10a upward.

The transfer sheets 18 and 20 may be carbon paper or the so-called "NCR" dry copy system. When the latter is used the surfaces of the ticket copies are prepared in the well-known manner for such transfer systems.

It is contemplated that the embossed indicia can be imprinted in machine readable characters and all or in part in reverse script on the back face 17a of the original copy 17.

Although an embodiment of the invention has been illustrated it is contemplated that the embossed certifying signature can be in positive script on the front face of the card; and alternatively, the certifying signature and the conventional card data can all be in reverse script. Likewise, other variants of the construction, arrangement and use of the described invention will become apparent to those skilled in the art in view of the description and the appended claims.

What is claimed is:

1. A credit card construction including a card having a front and back face, facsimile of a true signature of an authorized card holder in relief in reverse script on the back face of the card so as to print in the normally readable manner from said back face, means obscuring the front face side of said facsimile so that the facsimile cannot be seen from the front face of the card, relief script indicia on the front face of the card in a normally readable manner so as to be readable from the front of the card and capable of printing in a normally readable manner from said front face, the card being capable of printing normally raadable indicia from the front and back faces simultaneously.

2. The credit card construction of claim 1 wherein the obscuring means comprises an opaque member on the front face of the card, said member covering a minor area of the front face of the card and being substantially coextensive with the facsimile.

3. A credit card construction including a card having a front and back face, facsimile of a true signature of an authorized card holder in relief in reverse script on the back face of the card so as to print in the normally readable manner from said back face, opaque means on the front face side of said facsimile so that the facsimIle cannot be seen from the front face of the card, relief script indicia on the front face of the card in a normally readable mnner so as to be readable from the front of the card and capable of printing in a normally readable manner from said front face, the card being capable of printing normally readable indicia from the front and back faces simultaneously.

4. The credit card construction of claim 3 wherein the opaque means comprises a member affixed over the front face side of the facsimile, said member covering a minor area of the front face of the card.

* * * * *